(12) United States Patent
Takahashi et al.

(10) Patent No.: US 7,508,625 B2
(45) Date of Patent: Mar. 24, 2009

(54) MAGNETIC RECORDING DEVICE

(75) Inventors: Hiromasa Takahashi, Hachioji (JP); Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/698,929

(22) Filed: Jan. 29, 2007

(65) Prior Publication Data
US 2007/0230006 A1    Oct. 4, 2007

(30) Foreign Application Priority Data
Mar. 28, 2006    (JP) .............................. 2006-088349

(51) Int. Cl.
*G11B 5/127*    (2006.01)
(52) U.S. Cl. ................................. 360/125.03
(58) Field of Classification Search ............. 360/59, 360/125, 125.03; 369/13.01; 365/158; 977/858
See application file for complete search history.

(56) References Cited

U.S. PATENT DOCUMENTS

| | | | |
|---|---|---|---|
| 6,930,847 B2 | 8/2005 | Kai et al. | |
| 2003/0058749 A1* | 3/2003 | Yoo et al. | 369/13.01 |
| 2003/0107953 A1* | 6/2003 | Hong et al. | 369/13.01 |
| 2003/0218941 A1* | 11/2003 | Terao et al. | 369/13.01 |
| 2004/0042351 A1* | 3/2004 | Onoe et al. | 369/13.01 |
| 2004/0184361 A1* | 9/2004 | Ichihara et al. | 369/13.01 |
| 2006/0044661 A1* | 3/2006 | Ogawa wt al. | 360/59 |
| 2006/0114606 A1* | 6/2006 | Ide | 360/125 |
| 2006/0212978 A1* | 9/2006 | Brandenberger et al. | 977/858 |
| 2007/0242500 A1* | 10/2007 | Liu et al. | 365/158 |

FOREIGN PATENT DOCUMENTS

| | | |
|---|---|---|
| JP | 08-255707 | 3/1995 |
| JP | 2003-91801 | 9/2001 |

* cited by examiner

*Primary Examiner*—Tianjie Chen
(74) *Attorney, Agent, or Firm*—Reed Smith LLP; Juan Carlos A. Marquez, Esq.

(57) ABSTRACT

A magnetic recording device which can write magnetic information with high density. The device uses, for a magnetic recording layer of a magnetic recording medium, a magnetic material whose anisotropy energy varies with an applied electric field. The head has an electrode for applying an electric field to a recording area of the magnetic recording medium. Magnetic recording is performed by applying an AC electric field from the electrode while a DC magnetic field is applied to the recording area of the magnetic recording layer.

6 Claims, 8 Drawing Sheets

MAGNETIC RECORDING DEVICE

CLAIM OF PRIORITY

The present application claims priority from Japanese application JP 2006-088349 filed on Mar. 26, 2006, the content of which is hereby incorporated by reference into this application.

FIELD OF THE INVENTION

The present invention relates to a device which writes magnetic information, and more particularly to a novel magnetic recording device which writes magnetic information by changing the magnetized state of a magnetic recording layer by the use of anisotropy energy variation caused by an external physical action.

BACKGROUND OF THE INVENTION

In hard disk drives (HDD) and magnetic optical disks, as the tendency toward higher recording densities increases and the recording area per bit becomes smaller, technology for writing to, and reading from, a smaller area of a recording medium is demanded. However, for continuous media which are used in conventional HDDs, when the areal or bit density is increased to the order of terabits/square inch, the recording area per bit is as small as approx. 20 square nanometers and the problem of thermal disturbance is significant. Therefore, in commercial high density recording devices, a material with high anisotropy energy has been used to prevent thermal disturbance and efforts toward finer grains and reduction of intergrain interaction have been made to prevent the phenomenon of side writing. Recently, for higher recording densities, studies of discrete track media and patterned media have been conducted in which discrete patterns are made in the recording layers of the media in order to reduce noise associated with side writing phenomena. However, since the magnetic energy per recorded bit should be above a predetermined level for the purpose of preventing thermal disturbance, a large magnetic field would be required in a conventional recording system.

The write head uses a magnetic field which is generated from a magnetic pole by energizing a coil on the principle of an electromagnet. If the bit density is very high, the phenomenon of magnetic field insufficiency might be apparent. In order to solve this problem, heat-assisted magnetic recording has been considered in which the head is provided with a light source, such as a laser, and a material whose coercivity changes with heat is used for the recording medium, and during recording laser irradiation is done to raise the medium's temperature.

As a technique similar to the above, JP-A No. 91801/2003 proposes a recording system which uses a recording layer with a multilayered structure consisting of a layer of material with high anisotropy energy and a layer of photoexcited ferromagnetic material, and the recording layer's coercivity is reduced by magnetic material exchange coupling. This phenomenon is limited to the particular materials described in JP-A No. 255707/1996.

SUMMARY OF THE INVENTION

In a heat-assisted magnetic recording system, adjacent bits are also heated during recording and the influence of thermal fluctuations is serious. Therefore, in order to increase recording density, it is necessary to develop a material whose coercivity sharply varies with temperature. In a recording system which involves irradiation with light, the head must incorporate a laser mechanism, which leads to a very complicated structure and high cost.

The present invention provides a magnetic recording system which enables high density recording with a simple magnetic head using a non-multilayer type magnetic recording layer.

A magnetic recording device according to an embodiment of the present invention uses, as a recording layer, a ferromagnetic layer whose anisotropy energy varies with applied external energy, such as an electric field, and that has an assist source which applies external energy to a recording medium and a write head. If the applied external energy is an electric field, the recording layer is made of such a material that when an electric field is applied, the anisotropy energy of the recording medium changes and the coercivity decreases. More specifically, a magnetic semiconductor enables control of magnetic coupling or decoupling which depends on its outstanding carrier density, so that through this control and optimization of magnetic characteristics it is possible to modulate the carrier density and change the crystalline anisotropy by an external electric field while retaining ferromagnetism. This phenomenon is conspicuous in media with a monocrystal structure in which the easy magnetization direction is fixed in the longitudinal direction. In this case, since the easy magnetization axis itself moves when an electric field is applied, the coercivity largely changes.

For this reason, an electric field application mechanism is built in the write head. For example, an electrode layer is located adjacent to the magnetic pole of the write head. This structure is very simple and easy to realize. The system works as follows: an electric field is applied to the recording medium from the electric field application mechanism and when the coercivity of the recording medium decreases, recording is performed by a magnetic field from the write head and upon completion of recording, the head moves and the electric field becomes zero and the coercivity increases, so that magnetic information is stably held in the recording layer.

Hence, according to an embodiment of the present invention, magnetic information can be recorded on the magnetic recording medium with high density.

BRIEF DESCRIPTION OF THE DRAWINGS

The invention will be more particularly described with reference to the accompanying drawings, in which:

FIGS. 2A to 2C show the relationships between magnetization curves and external magnetic fields and recording conditions, wherein FIG. 2A shows that at E=0 magnetized state $M_L$ is held with a large coercivity; FIG. 2B shows that at E=$E_0$ magnetized state $M_H$ is held with a small coercivity; and FIG. 2C shows that at E=0 magnetized state $M_H$ is held with a large coercivity;

FIG. 4 show the relationships between magnetization curves and external magnetic fields and recording conditions, wherein

DETAILED DESCRIPTION OF THE PREFERRED EMBODIMENTS

Next, the principle of magnetic recording according to an embodiment of the present invention and preferred embodiments thereof will be described in reference to the accompanying drawings.

Figure 1:
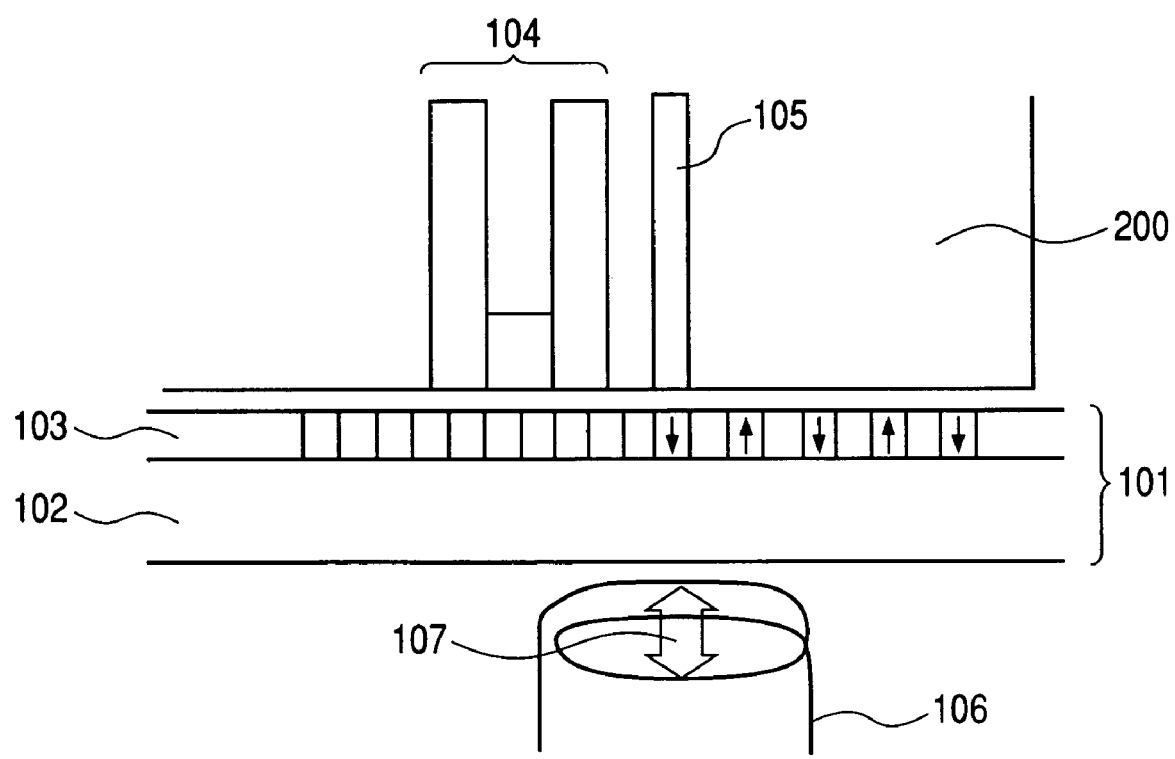
FIG. 1 is a conceptual diagram showing a magnetic recording and reproduction device according to an embodiment of the present invention.

A magnetic recording and reproduction system as a preferred embodiment of the present invention will be described below referring to FIG. 1. FIG. 1 is a schematic diagram showing the relationship among a magnetic recording medium 101, a write/read head 200, and a magnetic field application mechanism 106. The magnetic recording medium 101 includes an electrically conductive substrate 102 and a magnetic recording layer 103 and the magnetization of the recording layer is perpendicular to the film surface as shown in the figure. When the substrate 101 is a conductive substrate, it is advantageous in the sense that the electric potential of the substrate can be set to a specific value through a substrate fixing part and thus the level of electric field from the electric field application mechanism can be maintained constant. For example, the substrate may be grounded to get a reference voltage. On the other hand, it is also possible that the point of reference voltage is opposite to the electric field application mechanism with the substrate between them. This magnetic recording medium 101 is obtained by making the magnetic recording layer 103 from a material in which an easy magnetization direction exists in a direction perpendicular to the film surface, or by making discrete patterns in the medium's magnetic recording area to make the magnetization of individual patterns perpendicular to the film surface due to shape anisotropy. When viewed from above the medium, these patterns are circular, elliptical, quadrate (square, rectangular, rhombic and so on), hexagonal or the like. Their dot areas vary in the range from 100 to 5000 $nm^2$ depending on the recording density. For example, if the recording density is 1 terabit per square inch and the dot shape is rectangular, the area of each dot is 625 $nm^2$ with recording track width Tw<25 nm and bit width<25 nm.

The magnetic recording medium is produced by making a film on an aluminum or semiconductor substrate using a deposition method such as sputtering, vacuum evaporation or MBE. Alternatively, the medium may be produced by forming an underlayer of a conductive material on an insulating substrate in advance. Particularly, when a monocrystal conductive semiconductor substrate is used for the underlayer, a magnetic recording medium with uniform in-plane crystal orientation is produced. For the magnetic recording layer, a material whose anisotropy varies according to electric fields should be chosen. As such materials, magnetic semiconductors whose magnetic property varies with the carrier density are now known; specifically they include Mn-doped InAs compounds (InMn)As, Mn-doped GaAs compounds (GaMn)As, GaN, and ZnO. Among these, (InMn)As and (GaMn)As are highly characteristic at low temperatures. However, there are reports that with the increase in the amount of doping, these materials demonstrate ferromagnetic properties even at room temperature; and how their properties are demonstrated in the present invention has been confirmed. Among magnetic semiconductor materials at room temperature, materials which are highly carrier-doped are suitable for the above film structure according to an embodiment of the present invention.

An assist magnetic field 107 is applied to a recording area of the substrate of the magnetic recording medium from the back side of the substrate by a magnetic field application head 106. The magnetic field application head 106, which includes a coil or electromagnet, is attached to an arm which moves on the medium's back side synchronously with the write/read head 200 or designed to apply a magnetic field uniformly to the whole recording area from the medium's back side. The former approach is more desirable from the viewpoints of the possibility of writing errors and power consumption. The magnetic field application head 106 should be sufficiently larger than each of the above bits and each element of the write/read head 200.

The magnitude of the magnetic field applied by the magnetic field application head 106 varies according to the magnetic recording layer material. In some diluted magnetic semiconductors, their anisotropy energies vary according to the magnitude of the applied magnetic field and as a consequence their coercivities change. The magnetic field which can effectively cause this change is within the range from 100 Oe to 100,000 Oe and, practically, within the range from 100 Oe to 2000 Oe. The larger the magnetic field application head 106 is, the more it consumes electric power, which means that when it generates an intense magnetic field, it is costly. In addition, since a shield which reduces the influence of magnetic flux leakage is needed, its area should be as minimal as required. Therefore, it is desirable to provide a mechanism which focuses a magnetic flux on an area of 1 $cm^2$ or less, desirably 100 $\mu m^2$ or less, around a write bit.

The write/read head 200, located on the front side of the medium 101, includes: a read head 104 with a sufficient resolution and output capacity to detect magnetic field leakage from recorded bits; and an electric field application electrode 105 which applies an electric field and modulates the anisotropy energy of the medium to perform writing. The read head 104 consists of a magnetic read head with a high spatial resolution which uses a magnetoresistance effect such as GMR or TMR or a spintronics effect. On the other hand, the electric field application electrode 105 as a layer applies high-frequency periodic electric fields to the magnetic recording medium by high-frequency alternating current. In relation to frequencies, response of magnetic properties to changes in magnetic fields is stable in the range from a static state up to 3 GHz for normal 3d metal atom compounds. On the other hand, for the magnetic semiconductor medium used in the present invention, response of magnetic properties to changes in magnetic fields is equivalent to, or better than, that for 3d metals because an electronic state which generates magnetism involves electrons in a hybrid orbital caused by mixing s, d and p orbitals unlike 3d metals. Response of magnetic properties to changes in electric fields is sufficient in the above range.

The required size of the electric field application electrode 105 is connected to the recording density and the corresponding recording pattern width. In writing in dot patterns of a patterned medium, high density recording is possible since dots are apart from each other and the influence of side track writing is small and also a technique of adjusting the permittivity of the medium back side to concentrate an electric field is available. The voltage pulse generated on the electrode has a constant value between 1-5 V. However, some types of media require several hundreds of volts and necessitate the use of a special power supply. On the other hand, the size of the read head 104 depends on the size of a recorded dot. In current techniques such as TMR, the gap width limit is 40 nm or so; therefore the read head is usable when the recording density is 400 Gb/in$^2$ or so. In order to achieve a higher density, a read element with a higher resolution is needed. For example, in order to attain 1 terabit/square inch, a reading resolution of Gs<25 nm is needed. One approach may be a new head structure based on spintronics and another may be a probe type reading mechanism which uses a needle-shaped magnetic field sensor.

Figure 2A:
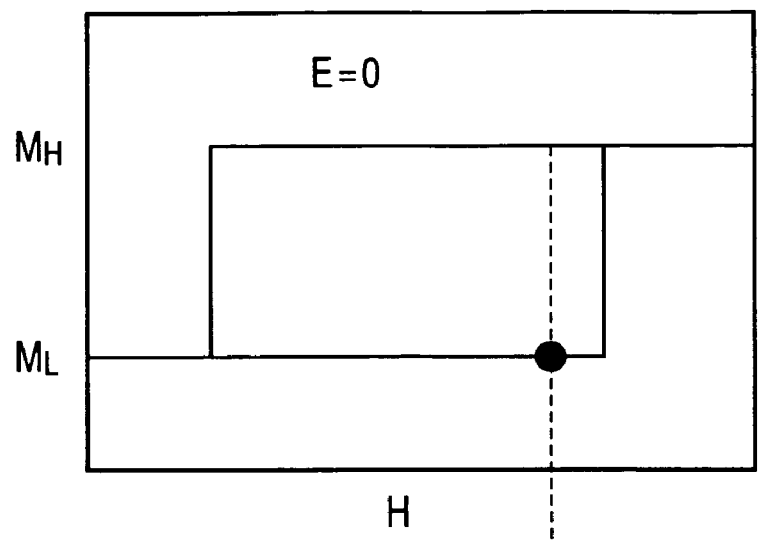
Figure 2B:
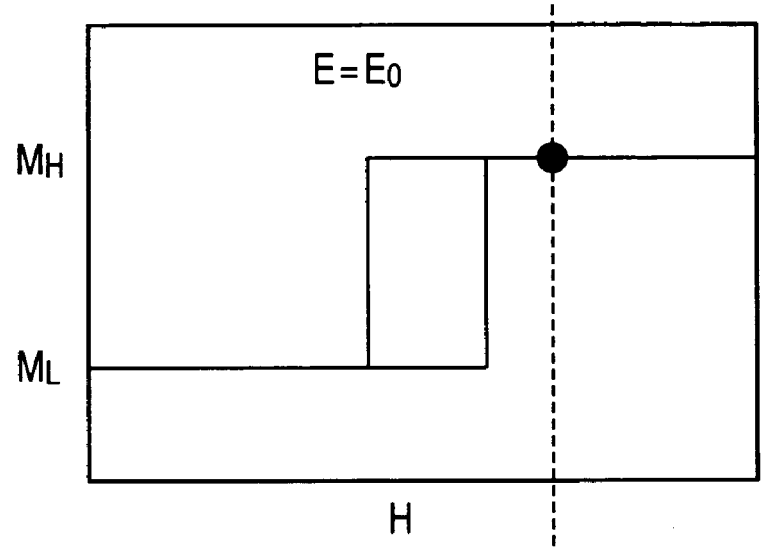
Figure 2C:
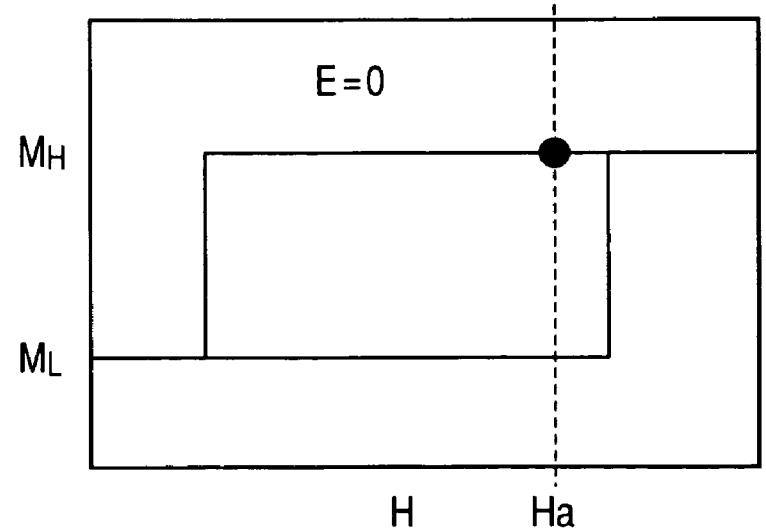

As shown in FIGS. 2A to 2C, when a given current is supplied to the magnetic field application head 106, a DC magnetic field with a given intensity is generated and a magnetic field Ha with a given magnitude is applied to the magnetic recording medium 101. On the other hand, an electric field with magnitude $E_0$ is applied to the write bit area of the magnetic recording medium 101 from the electric field application electrode 105 of the write/read head 200. When the applied electric field E is zero, the magnetic recording layer 103 of the magnetic recording medium 101 demonstrates magnetic field dependency with a large coercivity as shown in FIG. 2A; and when the applied electric field E is $E_0$, it demonstrates magnetic field dependency with a small coercivity as shown in FIG. 2B. Hence, the magnitude of the magnetic field Ha applied from the magnetic field application head 106 to the magnetic recording medium 101 is set to a value smaller than the coercivity at E=0 and larger than the coercivity at E=$E_0$ and the electric field from the electric field application electrode 105 is changed between $E_0$ and 0 at high speed so that two magnetized states, $M_H$ and $M_L$, are produced reversibly.

In other words, when the electric field E from the electric field application electrode 105 is $E_0$ while the magnetic field Ha is applied to the magnetic recording medium 101, the coercivity of the magnetic recording layer 103's area to which the electric field has been applied becomes small and the magnetized state of that area becomes $M_H$, as shown in FIG. 2B. After that, when the applied electric field becomes zero, the coercivity of that area of the magnetic recording layer 103 becomes large again but the magnetized state of the area remains $M_H$, as shown in FIG. 2C. When the electric field E from the electric field application electrode 105 is zero while the magnetic field Ha is applied to the magnetic recording medium 101, the magnetized state of the relevant area of the magnetic recording layer remains $M_L$, as shown in FIG. 2A. Writing is performed on the abovementioned principle. In this system, the speed of anisotropy reversal by electric fields can be higher than in the conventional magnetic recording system, permitting high speed magnetic modulation. This lowers the magnetic field level required for recording, resulting in reduction of electric power consumption required to generate a magnetic field.

In a magnetic recording device which employs this system, when writing is not done, usually the magnetic recording medium has a sufficient coercivity and thus is less vulnerable to thermal disturbance which might destroy magnetically recorded information, and also the head has a simple structure and is easy to manufacture.

Figure 3:
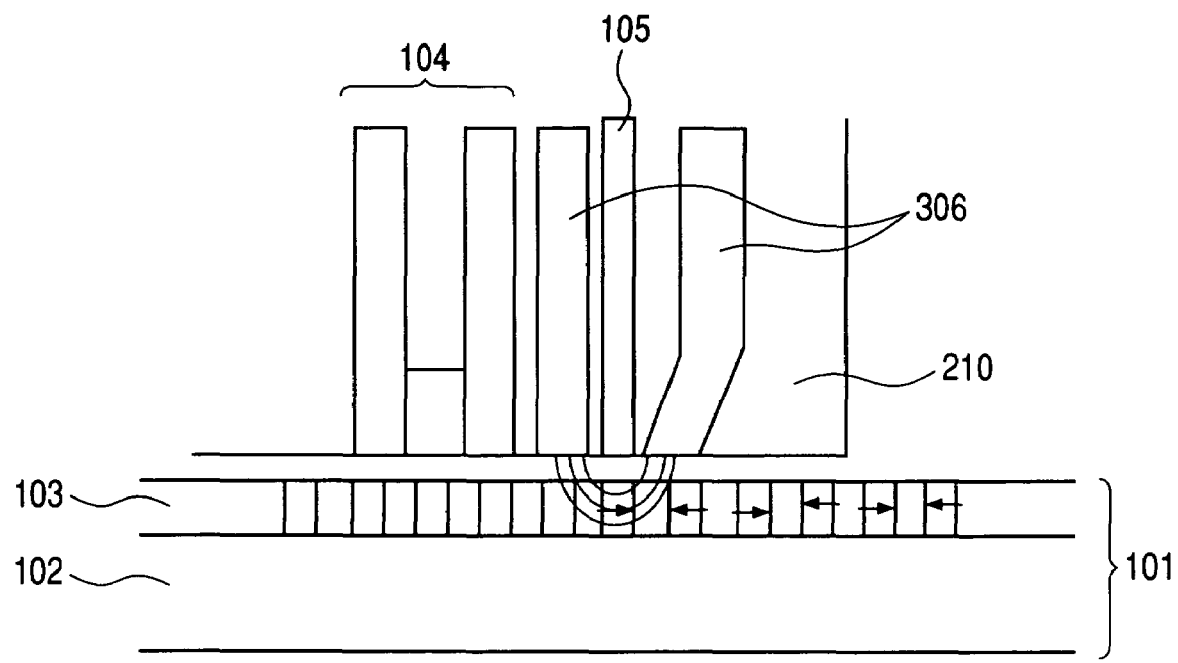
FIG. 3 is a conceptual diagram showing a magnetic recording and reproduction device according to another embodiment of the present invention.

A magnetic recording/reproduction device as another embodiment of the present invention will be described in reference to FIG. 3. FIG. 3 is a schematic diagram showing the relationship between a magnetic recording medium 101 and a write/read head 210. The magnetic recording medium 101 at least includes an electrically conductive substrate 102 and a magnetic recording layer 103 and the magnetization of the recording layer is parallel to the film surface as shown in the figure. This magnetic recording medium 101 is obtained by making the film of the magnetic recording layer 103 from a material in which an easy magnetization direction exists in the longitudinal direction, or by making discrete patterns in the medium's magnetic recording area to orient the magnetization in the longitudinal direction due to shape anisotropy.

The magnetic recording medium is produced by making a film on an aluminum or semiconductor substrate using a deposition method such as sputtering, vacuum evaporation or MBE. Alternatively, the medium may be produced by forming an underlayer of a conductive material on an insulating substrate in advance and grounding it. Particularly, when a monocrystal conductive semiconductor substrate is used for the underlayer, a magnetic recording medium with uniform in-plane crystal orientation is produced. For the magnetic recording layer, a material whose anisotropy varies according to electric fields is chosen as in the first embodiment.

The write/read head includes: a read head 104 with a sufficient resolution and output capacity to detect magnetic field leakage from recorded bits; an electric field application electrode 105 which applies an electric field and modulates the anisotropy energy of the medium to perform writing; and recording magnetic poles 306. The read head 104 consists of a read head which uses a magnetoresistance effect such as GMR or TMR or a spintronics effect. On the other hand, the electric field application electrode 105, located adjacent to the recording magnetic poles 306, applies an assisting electric field with a given intensity to the magnetic recording medium 101's area in which magnetic recording is performed.

The electric field application electrode 105 takes the form of an electrode layer and is integral with the head. The electric field application electrode 105 is located between the recording magnetic poles and return yokes and is exposed from the write/read head 210's side facing the medium. However, it is also possible that it is not exposed from the head side facing the medium and located inward or retracted in the head. If that is the case, the writing resolution depends on the distance between the recording magnetic poles and return yokes; however, because an electric field is applied from the electrode away from them, the area to which the electric field is applied is relatively wide. Therefore, in order to prevent any influence on adjacent tracks, it is necessary to optimize the amount of retraction of the electric field application electrode 105 from the head side facing the medium and the electric field intensity.

Figure 4A:
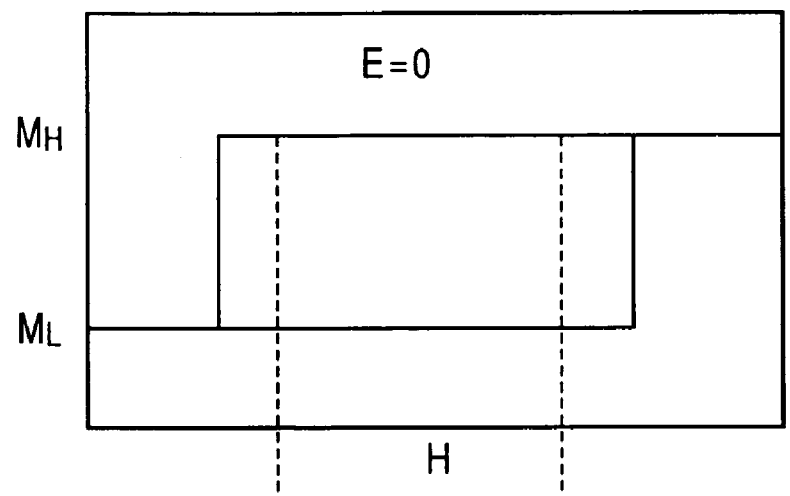
FIG. 4A shows a large coercivity at E=0.
Figure 4B:
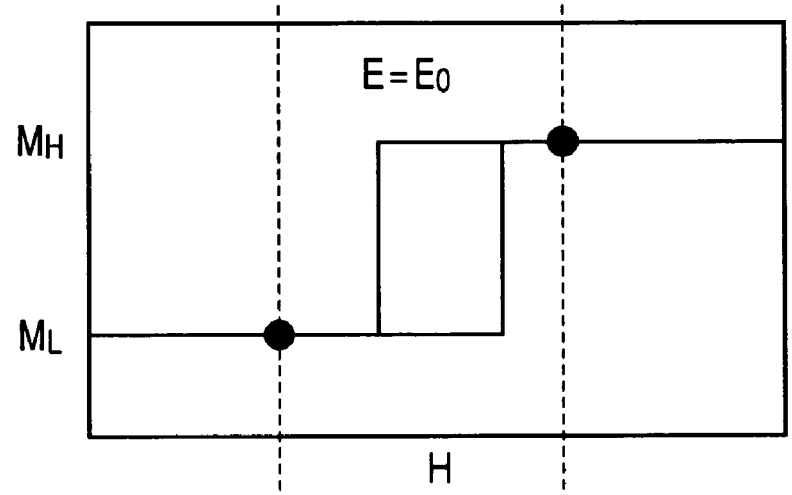
FIG. 4B shows a small coercivity at E=$E_0$.

As shown in FIG. 4, when a given level of voltage signal is applied to the electric field application electrode 105, an electric field with a given intensity is generated and a given electric field with magnitude $E_0$ is applied to the magnetic recording medium 101. On the other hand, an alternate current magnetic field with magnitude $H_0$ is applied to the write bit area of the magnetic recording medium 101 from the recording magnetic poles 306 of the write/read head 210. When the applied electric field is zero, the magnetic recording layer 103 of the magnetic recording medium 101 demonstrates magnetic field dependency with a large coercivity as shown in FIG. 4A; and when the applied electric field is $E_0$, it demonstrates magnetic field dependency with a small coercivity as shown in FIG. 4B. Hence, the magnitude of the applied magnetic field $H_0$ is set to a value smaller than the coercivity at E=0 and larger than the coercivity at $E=E_0$ and the magnetic field is reversed between $+H_0$ and $-H_0$ at high speed so that two magnetized states, $M_H$ and $M_L$, are produced reversibly.

Figure 4C:
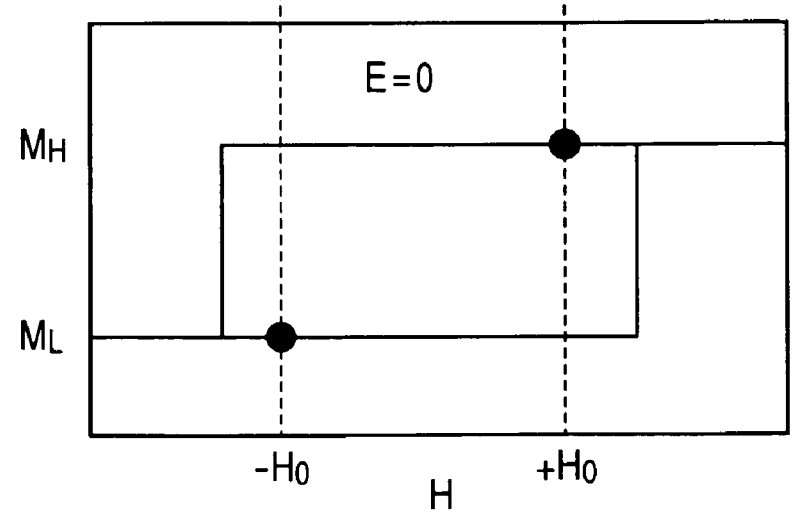
FIG. 4C shows that at E=0 magnetized state $M_H$ or $M_L$ is held.

In other words, as shown in FIG. 4B, when the electric field $E_0$ is applied and the coercivity of the magnetic recording layer 103 is small and a magnetic field $-H_0$ is applied from the recording magnetic poles 306 to the recording area of the magnetic recording layer 103, the magnetized state of the recording area becomes $M_L$; and when a magnetic field $+H_0$ is applied, the magnetized state of the recording area becomes $M_H$. After that, as shown in FIG. 4C, even when the applied electric field becomes zero, the magnetized state of the recording area remains $M_L$ or $M_H$. Writing is performed on the abovementioned principle.

In a magnetic recording device which employs this system, when writing is not done, usually the magnetic recording medium has a sufficient coercivity and thus is less vulnerable to thermal disturbance which might destroy magnetically recorded data, and also the head has a simple structure and is easy to manufacture.

Figure 5:
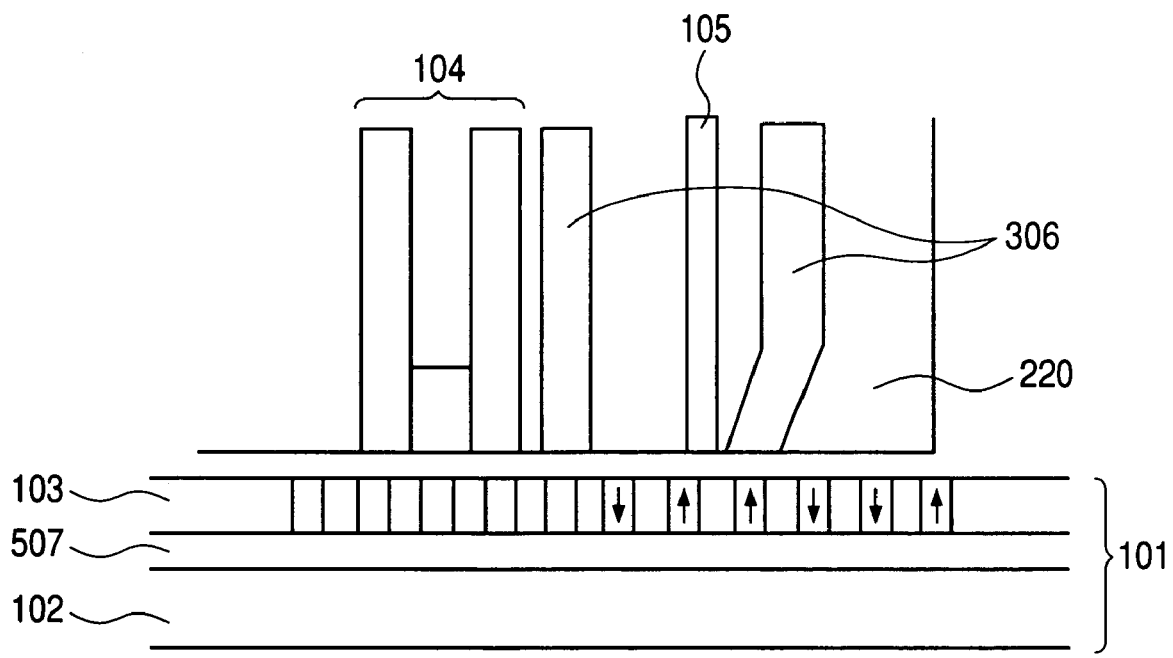
FIG. 5 is a conceptual diagram showing a magnetic recording and reproduction device according to another embodiment of the present invention.

A magnetic recording and reproduction device as another embodiment of the present invention will be described in reference to FIG. 5. FIG. 5 is a schematic diagram showing the relationship between a magnetic recording medium 101 and a write/read head 220. The magnetic recording medium 101 at least includes an electrically conductive substrate 102 and a magnetic recording layer 103 and, when necessary, a soft magnetic underlayer 507 under the magnetic recording layer 103. The magnetic recording layer is made of a material whose anisotropy varies according to electric fields as in the foregoing embodiments. The magnetization of the recording layer 103 is perpendicular to the film surface. This magnetic recording medium 101 is obtained by making the magnetic recording layer 103 from a material in which an easy magnetization direction exists in a direction perpendicular to the film surface, or by magnetic coupling with the soft magnetic underlayer 507, or by making discrete patterns in the magnetic recording layer 103 to make the magnetization of individual patterns perpendicular to the film surface due to shape anisotropy. It has been found that the magnetic recording and reproduction device according to this embodiment provides good performance as in the embodiments described above in reference to FIGS. 3 and 4A to 4C.

Figure 6:
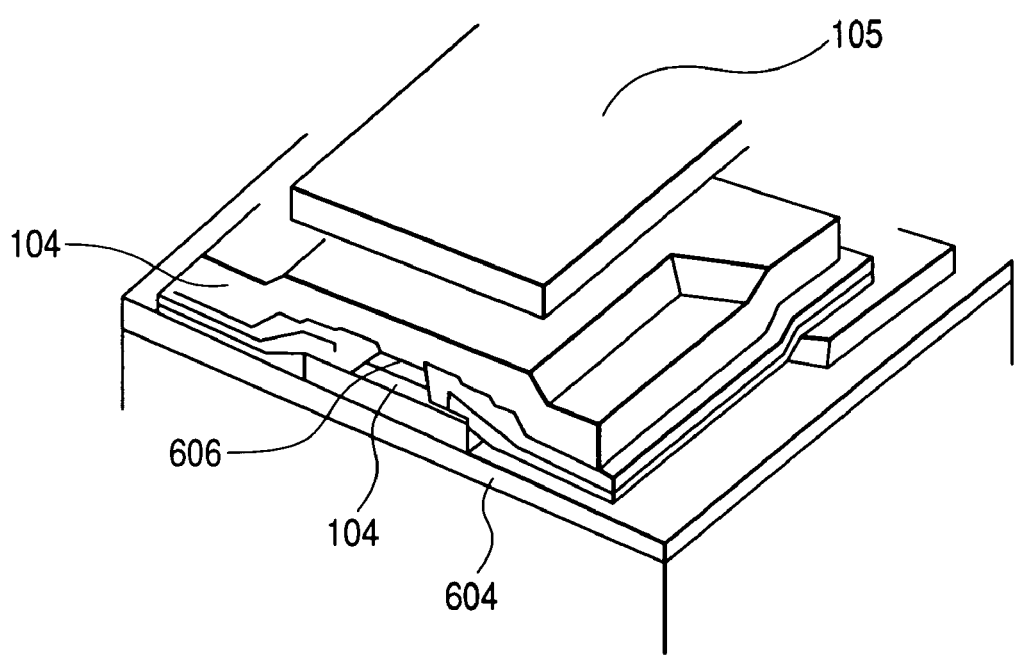
FIG. 6 schematically shows an example of a magnetic head structure according to an embodiment of the present invention.
Figure 7:
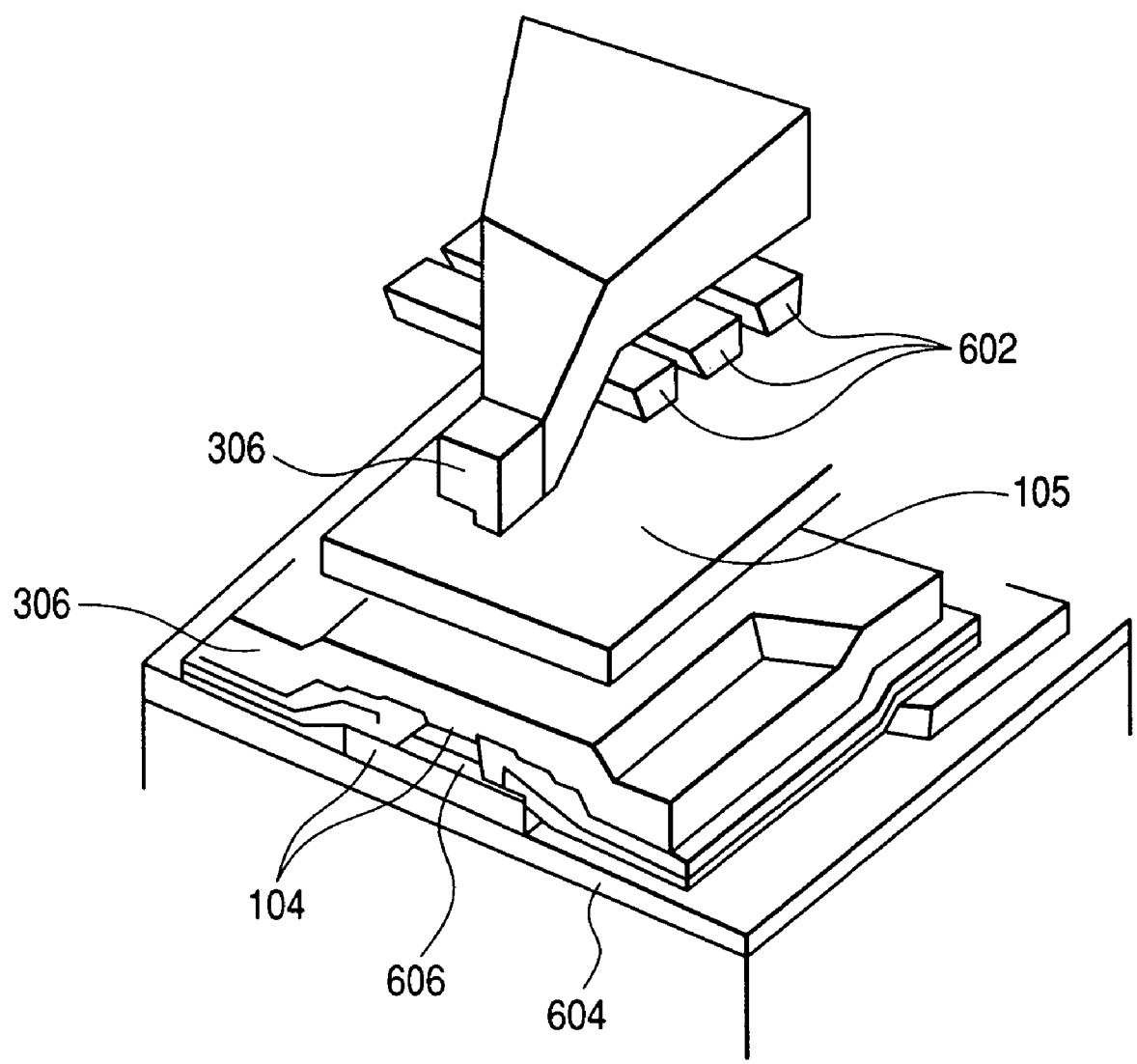
FIG. 7 schematically shows an example of a magnetic head structure according to an embodiment of the present invention.

Next, the head structures of the above magnetic recording and reproduction devices will be described in reference to FIGS. 6 and 7. FIG. 6 schematically shows a head assembly with an electric field application electrode 105 for writing. The head includes an electric field application electrode 105, read shields 104 and a read sensor 606. FIG. 7 schematically shows another head assembly with magnetic write heads in which an electric field application electrode 105 is located in the gap between the magnetic write heads 306.

Figure 8:
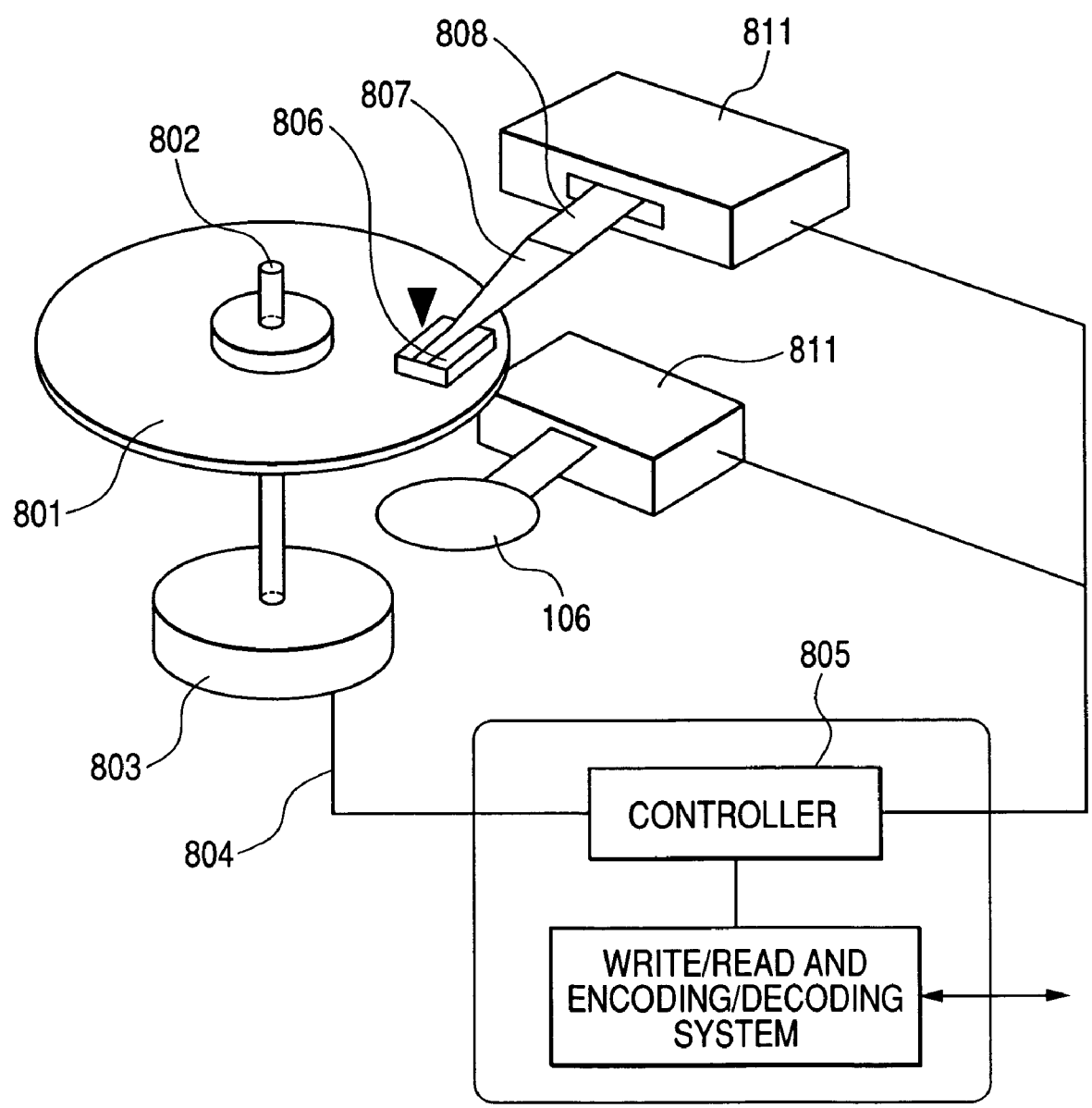
FIG. 8 schematically shows an example of a magnetic disk device structure according to an embodiment of the present invention.
Figure 9:
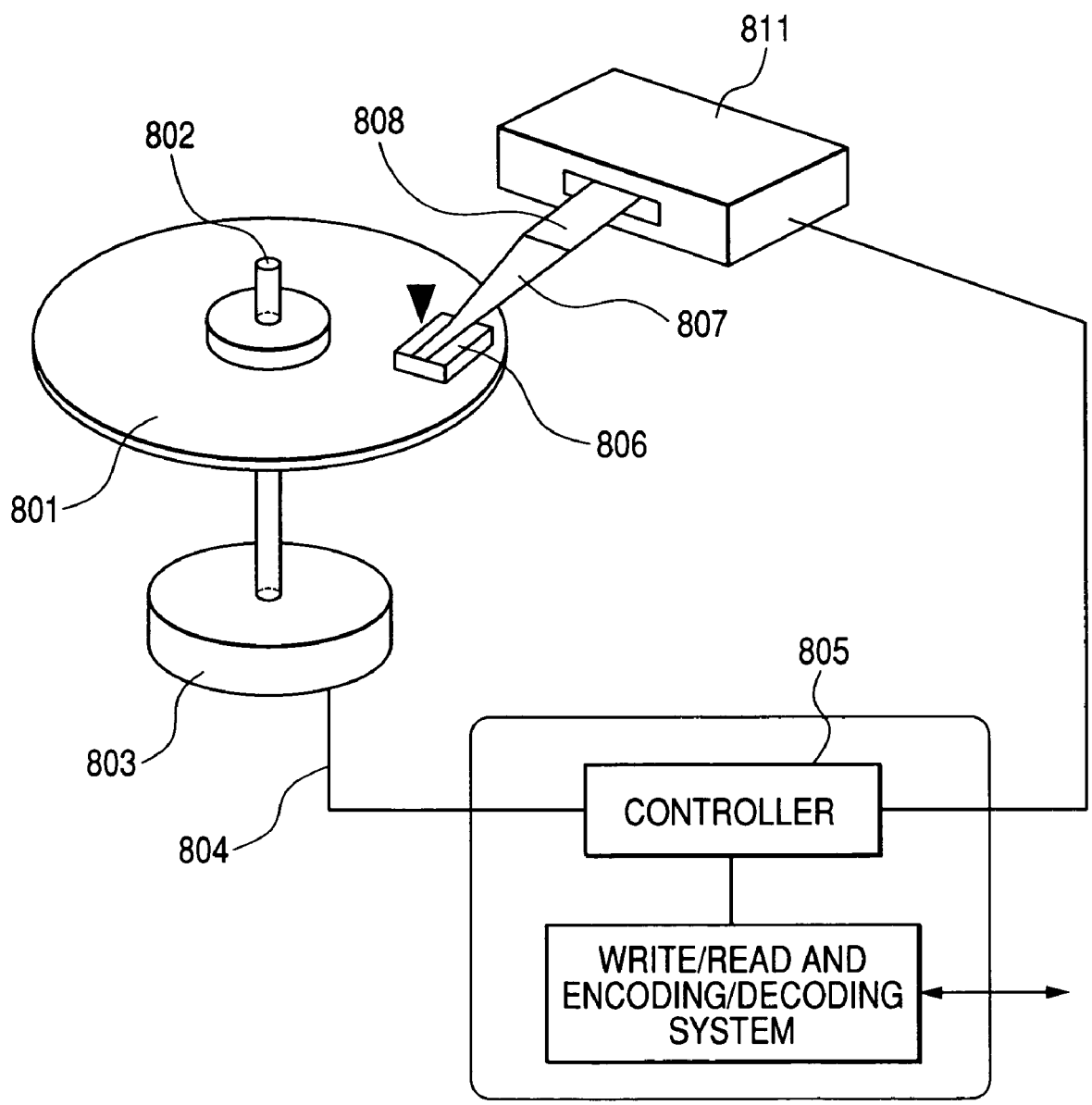
FIG. 9 schematically shows an example of a magnetic disk device structure according to an embodiment of the present invention.

FIGS. 8 and 9 schematically show examples of magnetic disk device structures according to an embodiment of the present invention. First, the magnetic disk device structure as shown in FIG. 9, which is simpler and incorporates the head assembly as described in reference to FIG. 7, is explained below. This disk device includes: a magnetic disk 801 as a magnetic recording medium in the form of a disk in which data is written in concentric recording regions called tracks; a write/read head 806 for reading or writing data according to an embodiment of the present invention; an actuator 811 which supports the write/read head 806 and moves the magnetic disk 801 to a specific position on the magnetic disk 801; and control means 805 which controls transmission/reception of data read or written by the magnetic head and movement of the actuator. At the same time when the magnetic disk 801 starts rotating, the write/read head 806 moves above the disk surface to access a position where target data is recorded. The write/read head 806 is fitted to an arm 808 through a suspension 807. The suspension 807 is slightly elastic and the arm 808 is fitted to the actuator 811. The actuator 811 is controlled according to an electric signal sent from the control means 805 through line 804.

Similarly, FIG. 8 shows an example of the structure of the magnetic disk device which incorporates the head assembly as shown in FIG. 6, where the device is characterized by provision of a magnetic field application mechanism 106 in the substrate back side zone. The magnetic field application mechanism 106 is much larger than the magnetic head. Synchronously with the head actuator, the magnetic field application mechanism 106 in the substrate back side zone moves and it is possible to moderate the positioning accuracy or speed of the magnetic field application mechanism 106 by optimization of the control means.

While the magnetic disk 801 is rotating, an air flow due to the disk rotation causes air bearing between the slider holding the write/read head 806 and the disk surface so that the slider floats from the surface of the disk 801. Therefore, while the magnetic disk device is in operation, this air bearing effect balances with the low elastic force of the suspension 807 so that the slider does not touch the magnetic disk surface or floats from it, maintaining a given distance from the magnetic disk 801. Typically, the control means 805 includes a logic circuit, a memory and a microprocessor. The control means 805 transmits and receives a control signal through various lines and controls various constituent means of the magnetic disk device. For example, a motor 803 is controlled according to a motor drive signal transmitted through line 804. The actuator 811 is controlled so as to move and position a selected slider to a target data track on a relevant magnetic disk 801 in an optimal manner according to a head position control signal and a seek control signal which are transmitted through line 809 and the like.

According to control signals, the magnetic head 810 reads data on the magnetic disk 801 and converts it into an electric signal, which is then received through the line 809 and decoded. An electric signal to be written as data on the magnetic disk 801 is transmitted to the write/read head 806 through the line 809. In other words, the control means 805 controls transmission/reception of data which the write/read head 806 reads or writes. It is also possible that the write/read head 806 directly transmits and receives read and write signals as mentioned above. The control signals include, for example, access control signals and clock signals. It is also possible that the magnetic disk device has a plurality of magnetic disks and actuators and the actuators have a plurality of write/read heads. As for media, the figure shows that a disk medium rotates and the head accesses it. However, it is also possible to use an alternative system in which many heads do scanning over a fixed medium concurrently. A so-called disk array device may be configured by the use of plural such mechanisms. The use of the magnetic recording medium and the write/read head according to an embodiment of the present invention makes it possible to achieve magnetic recording/reproduction with a reproduction density of over 1 $Tb/in^2$.

The invention claimed is:

1. A magnetic recording device comprising:
   a magnetic recording medium having a magnetic recording layer comprising a magnetic material with an anisotropy energy that varies with an applied electric field;

a drive which drives the magnetic recording medium;

a head comprising an electrode for applying at least a DC one of the assisting electric field to a recording area of the magnetic recording layer and a magnetic pole for applying a magnetic field to the recording area; and an actuator which moves the head to a desired position of the magnetic recording medium, wherein magnetic recording is performed by applying an AC one of the magnetic field from the magnetic pole and the DC assisting electric field to the magnetic recording layer, wherein the electrode is located between a pair of the magnetic poles for applying the magnetic field to the recording area, and wherein the magnetic recording medium consists of an electrically conductive substrate and the magnetic recording layer.

2. The magnetic recording device according to claim 1, wherein the coercivity of the magnetic material decreases when the assisting electric field is applied.

3. The magnetic recording device according to claim 1, wherein the magnetic material of the magnetic recording medium is a magnetic semiconductor material.

4. The magnetic recording device according to claim 1, wherein magnetization of the magnetic recording layer is parallel to a surface thereof facing the head.

5. The magnetic recording device according to claim 1, wherein when said at least a DC one of the assisting electric field E with a magnitude E0 is applied to the recording area of the magnetic recording layer via the electrode, said AC one of the magnetic field H with a magnitude H0 is applied to a write bit area of the magnetic recording layer via the magnetic poles to perform a writing operation.

6. The magnetic recording device according to claim 5, wherein
  when E=0, the magnetic recording layer demonstrates magnetic field dependency with a large coercivity,
  when E=E0, the magnetic recording layer demonstrates magnetic field dependency with a small coercivity,
  the magnitude H0 of the applied magnetic field H is set to a value smaller than the coercivity at E=0 and larger than the coercivity at E=E0, and
  the magnetic field H is reversed between +H0 and −H0 to produce two magnetized states MH and ML reversibly.

* * * * *